United States Patent
Chen

(10) Patent No.: US 8,059,353 B1
(45) Date of Patent: Nov. 15, 2011

(54) MAGNETIC STORAGE SYSTEMS AND METHODS ALLOWING FOR RECOVERY OF DATA BLOCKS WRITTEN OFF-TRACK WITH NON-CONSTANT OFFSETS

(75) Inventor: Michael Chen, Westminster, CO (US)

(73) Assignee: Seagate Technology LLC, Scotts Valley, CA (US)

(*) Notice: Subject to any disclaimer, the term of this patent is extended or adjusted under 35 U.S.C. 154(b) by 299 days.

(21) Appl. No.: 12/197,508

(22) Filed: Aug. 25, 2008

Related U.S. Application Data

(62) Division of application No. 11/103,900, filed on Apr. 12, 2005, now Pat. No. 7,522,365.

(60) Provisional application No. 60/624,745, filed on Nov. 3, 2004.

(51) Int. Cl.
G11B 5/09 (2006.01)
G11B 27/36 (2006.01)
G11B 5/03 (2006.01)
G11B 5/58 (2006.01)

(52) U.S. Cl. ............ 360/53; 360/31; 360/66; 360/77.01

(58) Field of Classification Search .................. None
See application file for complete search history.

(56) References Cited

U.S. PATENT DOCUMENTS

| | | | | |
|---|---|---|---|---|
| 4,578,723 A * | 3/1986 | Betts et al. | ................ | 360/77.08 |
| 5,379,162 A | 1/1995 | Cunningham et al. | | |
| 5,412,518 A * | 5/1995 | Christner et al. | ............... | 360/66 |
| 6,094,806 A | 8/2000 | McNeil et al. | | |
| 6,181,506 B1 | 1/2001 | Shimura et al. | | |
| 6,446,236 B1 | 9/2002 | McEwen et al. | | |
| 6,476,992 B1 | 11/2002 | Shimatani | | |
| 6,606,210 B1 | 8/2003 | Coker et al. | | |
| 6,643,084 B1 | 11/2003 | Andrew et al. | | |
| 6,691,278 B1 | 2/2004 | Patapoutian | | |
| 6,771,444 B2 | 8/2004 | Smith et al. | | |
| 7,088,535 B2 * | 8/2006 | Kim et al. | ....................... | 360/53 |
| 7,522,365 B1 | 4/2009 | Chen | | |
| 2003/0202268 A1 | 10/2003 | Wang et al. | | |

OTHER PUBLICATIONS thefreedictionary.com, Definition—"linear regresion", 2003.*

* cited by examiner

*Primary Examiner* — Daniell L Negron
(74) *Attorney, Agent, or Firm* — Westman, Champlin & Kelly, P.A.

(57) ABSTRACT

A magnetic storage system includes a disk, a head, an actuator, a read channel, and a main controller. The main controller causes the head to read a data block of a selected track of the disk at each of a plurality of fixed offsets from a center of the selected track. The main controller samples a gain in the read channel a plurality of times while the head is reading the data block at each of the plurality of fixed offsets to obtain a plurality of gain samples for each of the plurality of fixed offsets. If the data block was written off-track with a non-constant offset, the main controller determines an approximate starting position and an approximate rate of change of an off-track deviation of the data block based on the plurality of gain samples for the plurality of fixed offsets.

18 Claims, 10 Drawing Sheets

MAGNETIC STORAGE SYSTEMS AND METHODS ALLOWING FOR RECOVERY OF DATA BLOCKS WRITTEN OFF-TRACK WITH NON-CONSTANT OFFSETS

CROSS-REFERENCE TO RELATED PATENT APPLICATIONS

This application is a divisional application of U.S. patent application Ser. No. 11/103,900, filed Apr. 12, 2005, entitled "Magnetic Storage Systems and Methods Allowing for Recovery of Data Blocks Written Off-Track with Non-Constant Offsets", which claims priority to U.S. Provisional App. Ser. No. 60/624,745, filed Nov. 3, 2004, entitled "Inertial Off-track Recovery", the entire contents of both of which are incorporated by reference herein.

BACKGROUND OF THE INVENTION

1. Field of the Invention

Embodiments of the present invention relate generally to magnetic storage systems and methods and, in specific embodiments, to a magnetic storage system including a head, a read channel, and a main controller, in which the main controller obtains a gain profile by sampling a gain in the read channel a plurality of times while the head is reading a data block at a plurality of fixed offsets, and the main controller determines an approximate starting position and an approximate rate of change of an off-track deviation of the data block based on the gain profile.

2. Related Art

Magnetic storage systems, such as disk drives, are commonly used in computers and other devices for the storage and retrieval of data. Users of disk drives often store important data that would be costly to replace or recreate if lost or corrupted. Thus, disk drive reliability is of great importance to many users. In order to improve disk drive reliability, disk drive manufacturers have developed a considerable number of data recovery procedures that may be employed to attempt to recover data when a data read error is encountered. Despite the efforts of disk drive manufacturers, some types of data read errors, such as those caused by non-constant off-track write events, still persist that cannot be remedied with the related art data recovery procedures.

In general, related art disk drives comprise one or more disks for storing data, an actuator, one or more transducers or heads, and a servo controller. Each head is operable to read data from and write data to concentric circular tracks on a surface of a corresponding disk. The heads are attached to the actuator, and when a head performs a read or a write operation on a disk, the actuator is moved so that the head is positioned over a center of a selected track for the operation. The movement of the actuator is controlled by the servo controller based in part on servo information read by the head from embedded servo sectors on the disk.

Using servo information to position a head of a disk drive over a center of a selected track generally permits for satisfactory performance when the disk drive operates under vibration free conditions in which the disk drive is not subject to movement from external sources. Even under vibration free conditions, there may still be some internal factors that can cause misalignment of a head with respect to a track center. A non-exhaustive list of such internal factors is discussed in U.S. Pat. No. 6,094,806 entitled "Method for Fabricating a Dual Element Head", and includes spindle run out, resonances and disk flutter, thermal track shift, head settling, actuator interactions, improper servo writing, and the like.

When operating in various environments, a disk drive may be subject to external forces in the form of vibrations or shocks. Vibrations may be caused by, for example, mechanical interactions between disk drives that operate on a same computer rack, and the like. When a disk drive operates under vibration conditions, an actuator on which a head is located may be caused to oscillate and, thus, the head may be positioned farther distances away from a track center. A shock event differs from vibrations in that a shock is typically a one time external force that acts on a disk drive and causes a head to be positioned far away from a track center. A shock may be caused by, for example, a strike on a disk drive, dropping a laptop in which a disk drive is located, pounding on a disk drive, movement due to a bad bearing in a cooling fan near a disk drive, tapping or pounding on a table on which a computer housing a disk drive is located, and the like.

When a head is positioned away from a track center, such misalignment may lead to an off-track read or an off-track write. An off-track read occurs when a head is positioned away from a track center during a read operation. When there is an off-track read, the head may be unable to read data, without an error, from the track. An off-track write occurs when a head is positioned away from a track center during a write operation and the head writes data away from the track center.

Some types of off-track writes have a constant offset from track center while other types of off-track writes have a non-constant offset from track center. An off-track write with a constant offset occurs when a write operation is performed for a data block and the data block is written at substantially the same offset away from a track center over an entire physical data sector. An off-track write with a non-constant offset occurs when a write operation is performed for a data block and the data block is written at a varying offset from a track center over at least some portion of a physical data sector.

FIG. 1 is a drawing that illustrates a non-constant off-track write event. In FIG. 1, the horizontal bands 30 represent data tracks that extend circumferentially around a surface of a disk. The vertical lines 40 represent spokes where servo patterns are written in embedded servo sectors for each track. The areas between spokes in each track represent data sectors where data blocks can be stored during disk drive operation. In FIG. 1, approximately four data sectors are shown between each of the spokes, but it should be appreciated that some disk drives may have, for example, around fifteen data sectors between spokes. Also, in FIG. 1, approximately forty-three data sectors are shown for each track, but it should be appreciated that a typical disk drive may have, for example, around one thousand data sectors per track.

The area that is circled in FIG. 1 shows a data block that has been written off-track with a non-constant offset in a data sector. As shown in the circled area, the written data of the data block goes up and moves away from a track center near an end of the data sector. Thus, the data block is written off-track, because at least a portion of the data block is not positioned near the center of the track. Also, the data block written off-track has a non-constant offset because the offset of the data block varies over the data sector. Such a non-constant off-track write event may have been due to, for example, a shock that caused a head to be positioned away from the track center during a write operation.

Related art disk error recovery measures have been unable to recover data blocks written off-track with non-constant offsets. In the related art, disk error recovery has been typically performed by proceeding through a list of data recovery procedures until a data block is either recovered successfully or the recovery procedures are exhausted. Such lists of data recovery procedures commonly include thirty or more data recovery procedures such as rereads, head shifts, routines with error correcting codes, and the like. Head shifts are reads at fixed off-track positions.

In the related art, when a read error is detected for a data block, some of the recovery procedures that are typically employed to attempt to read the data of the data block include head shifts at fixed positions. For example, data blocks that are written off-track may be read repeatedly at fixed servo positions away from track center, such as 6%, 12%, −6%, −12%, and so on, until the data block is either read successfully or the number of servo positions to be tried is exhausted without success. By positioning the head at fixed off-track positions, such data recovery procedures are able to read data blocks that have been written off-track with constant offsets. However, positioning a head at fixed offsets does not permit for reading data blocks that have been written off-track with non-constant offsets, because such data blocks do not have a fixed offset value throughout an entire data sector. As a result, related art data recovery procedures have been ineffective in recovering data of data blocks written off-track with non-constant offsets.

Related art data recovery procedures in which reads are performed at fixed off-track positions to attempt to recover data are disclosed in the following patents: (1) U.S. Pat. No. 5,379,162 entitled "Customized Data Recovery Procedures Selected Responsive to Readback Errors and Transducer Head and Disk Parameters"; (2) U.S. Pat. No. 6,771,444 entitled "Method and Apparatus for Implementing Adaptive Reordering of Data Recovery Procedure Steps in a Disk Drive"; (3) U.S. Pat. No. 6,606,210 entitled "Intelligent Sector Recovery Algorithm"; and (4) U.S. Pat. No. 6,643,084 entitled "Adaptive Off-Track Recovery".

As noted above, while the related art data recovery procedures are able to recover data blocks written off-track at constant offsets, they are not able to recover data blocks written off-track with non-constant offsets. Moreover, the related art has no way to determine whether a data read error is due to an off-track write before performing recovery procedures, and has no intelligence to distinguish between a constant off-track write event and a non-constant off-track write event. As a result, needless attempts are made to read data at fixed servo positions even when the data has been written off-track with a non-constant offset and could not be recovered by positioning the head at fixed offsets.

Thus, the related art procedures "blindly" position a head off-track at fixed positions in order to try to recover data, and a large number of retries are performed at different fixed off-track increments until either the data is recovered successfully or the recovery measures are exhausted. If the head shifts at fixed servo positions are not successful in recovering data, the related art continues to perform a number of remaining data recovery procedures contained in a list even when the remaining procedures cannot recover data blocks written off-track with non-constant offsets. Thus, the related art data recovery procedures have low intelligence, high redundancy, and require extended recovery time.

An additional problem with the related art is that related art magnetic storage systems provide no way to cause a controlled positioning of a head while the head is reading data from a data sector. The related art systems only provide for controlling a positioning of a head when the head is reading data from embedded servo sectors. With such magnetic storage systems, the head must remain at a fixed position while reading data from data sectors. Because the related art systems do not provide for causing a controlled positioning of a head while the head is reading data from a data sector, the related art systems are incapable of recovering data blocks written off-track with non-constant offsets.

In light of the above mentioned problems, there is a need for a magnetic storage system that can determine whether a data block has been written off-track, and that can determine whether an offset of a data block from a track center is constant or non-constant. There is also a need for a magnetic storage system that can recover a data block written off-track with a non-constant offset. Furthermore, there is a need for a magnetic storage system that can cause a controlled positioning of a head while the head is reading data from a data sector.

SUMMARY OF THE DISCLOSURE

Embodiments of the present invention relate to magnetic storage systems and methods that allow for determining whether a data block has been written off-track based on gain samples obtained from a read channel while a head is reading the data block at each of a plurality of fixed offsets from a track center. Various embodiments may further use the gain samples to determine whether an offset of a data block is constant or non-constant, and to determine an approximate starting position and an approximate rate of change of an off-track deviation of a data block. Some embodiments may cause a controlled positioning of a head while the head is reading a data block of a data sector based on an approximate starting position and an approximate rate of change of an off-track deviation of the data block and, thus, data blocks that have been written off-track with non-constant offsets may be recovered.

Such magnetic storage systems and methods may provide for a more direct correction of read errors and, thus, mitigate needless recovery attempts at various fixed servo positions during disk error recovery operations. Hence, embodiments of the present invention may reduce redundancy of data recovery procedures, reduce data recovery time, and increase disk drive reliability.

A magnetic storage system according to an embodiment of the present invention includes a disk, a head, an actuator, a read channel, and a main controller. A surface of the disk has a plurality of tracks for storing data. The head generates an analog signal when reading data from the disk, and the actuator allows for positioning the head over a selected track of the plurality of tracks. The read channel provides digital data based on the analog signal generated by the head, and the main controller performs operations related to disk error recovery.

In various embodiments, a magnetic storage system includes a main controller that causes a head to read a data block of a selected track at each of a plurality of fixed offsets from a center of the selected track. The main controller of such embodiments may then sample a gain in a read channel a plurality of times while the head is reading the data block at each of the plurality of fixed offsets to obtain a plurality of gain samples for each of the plurality of fixed offsets. In further embodiments, the main controller is configured to determine whether the data block was written off-track based on at least one of the plurality of gain samples for at least one of the plurality of fixed offsets.

In still further embodiments, the main controller is configured to determine, in the event that the main controller determines that the data block was written off-track, whether an offset of the data block from the center of the selected track is constant based on at least one of the plurality of gain samples for at least one of the plurality of fixed offsets.

In yet further embodiments, the main controller is configured to determine, in the event that the main controller determines that the offset of the data block is not constant, an approximate starting position and an approximate rate of change of an off-track deviation of the data block based on at least one of the plurality of gain samples for at least one of the plurality of fixed offsets. Moreover, in further embodiments, the main controller is configured to cause the head to read the data block in accordance with the approximate starting position and the approximate rate of change of the off-track deviation of the data block.

In some embodiments, the main controller is configured to determine, for each fixed offset of the plurality of fixed offsets, an average gain of the plurality of gain samples for the fixed offset, and to determine a specific offset among the plurality of fixed offsets that has a lowest average gain. In further embodiments, the main controller is configured to determine whether the data block was written off-track based on the specific offset that has the lowest average gain. In yet further embodiments, the main controller is configured to determine a standard deviation of the plurality of gain samples for the specific offset, and to determine whether an offset of the data block from the center of the selected track is constant based on the determined standard deviation.

In another embodiment, a magnetic storage system includes a main controller for determining an approximate starting position and an approximate rate of change of an off-track deviation of a data block based on gain samples obtained by sampling a gain in a read channel. In yet another embodiment, a magnetic storage system includes a main controller for causing a controlled positioning of a head while the head is reading data from a data sector.

In various embodiments, a magnetic storage system allows for calculating a bias current for correcting a position of a head based on an approximate starting position and an approximate rate of change of an off-track deviation of a data block. In various embodiments, a magnetic storage system includes a read channel that has a variable gain amplifier, an analog-to-digital converter, and an automatic gain control circuit, and allows for a gain of the variable gain amplifier or a baseline gain of digital samples from the analog-to-digital converter to be sampled while a head is reading a data block.

In various embodiments, a method used for disk error recovery in a magnetic storage system is provided for determining an approximate starting position of an off-track deviation of a data block by differentiating an obtained gain profile. In further embodiments, an approximate rate of change of an off-track deviation of a data block is determined based on a polynomial fit of sample points obtained from a gain profile.

Therefore, embodiments of the present invention may enhance the reliability of a magnetic storage system, such as a disk drive, by allowing for the recovery of data blocks written off-track with non-constant offsets. Also, embodiments of the present invention may provide for greater intelligence and less redundancy than related art magnetic storage systems by determining whether a data block has been written off-track before deciding what type of disk error recovery procedure to employ to read the data block. Furthermore, embodiments of the present invention may allow for improved performance by permitting for a controlled positioning of a head while the head is reading data from a data sector, rather than only when the head is reading data from an embedded servo sector.

DETAILED DESCRIPTION OF PREFERRED EMBODIMENTS

Figure 1:
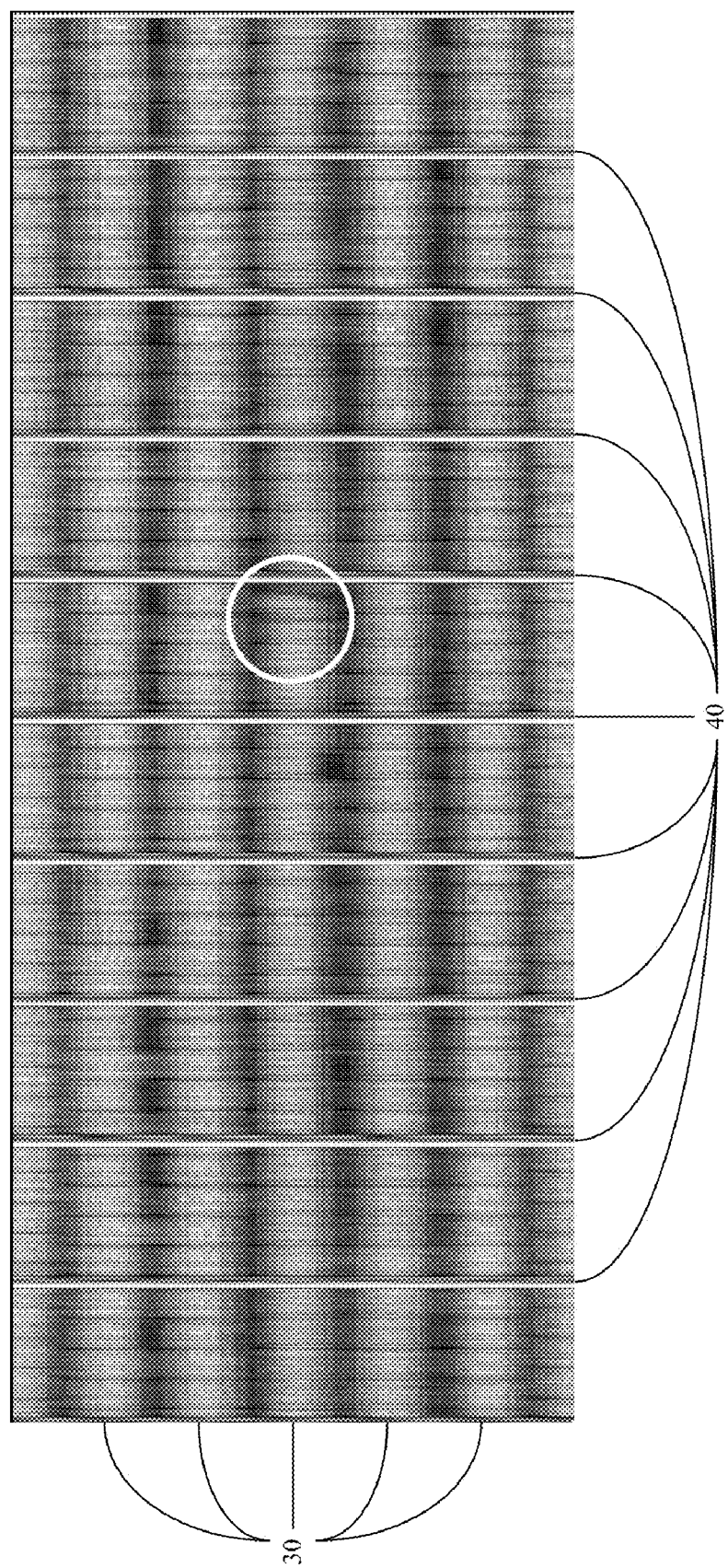
FIG. 1 is a drawing that illustrates a non-constant off-track write event.
Figure 2:
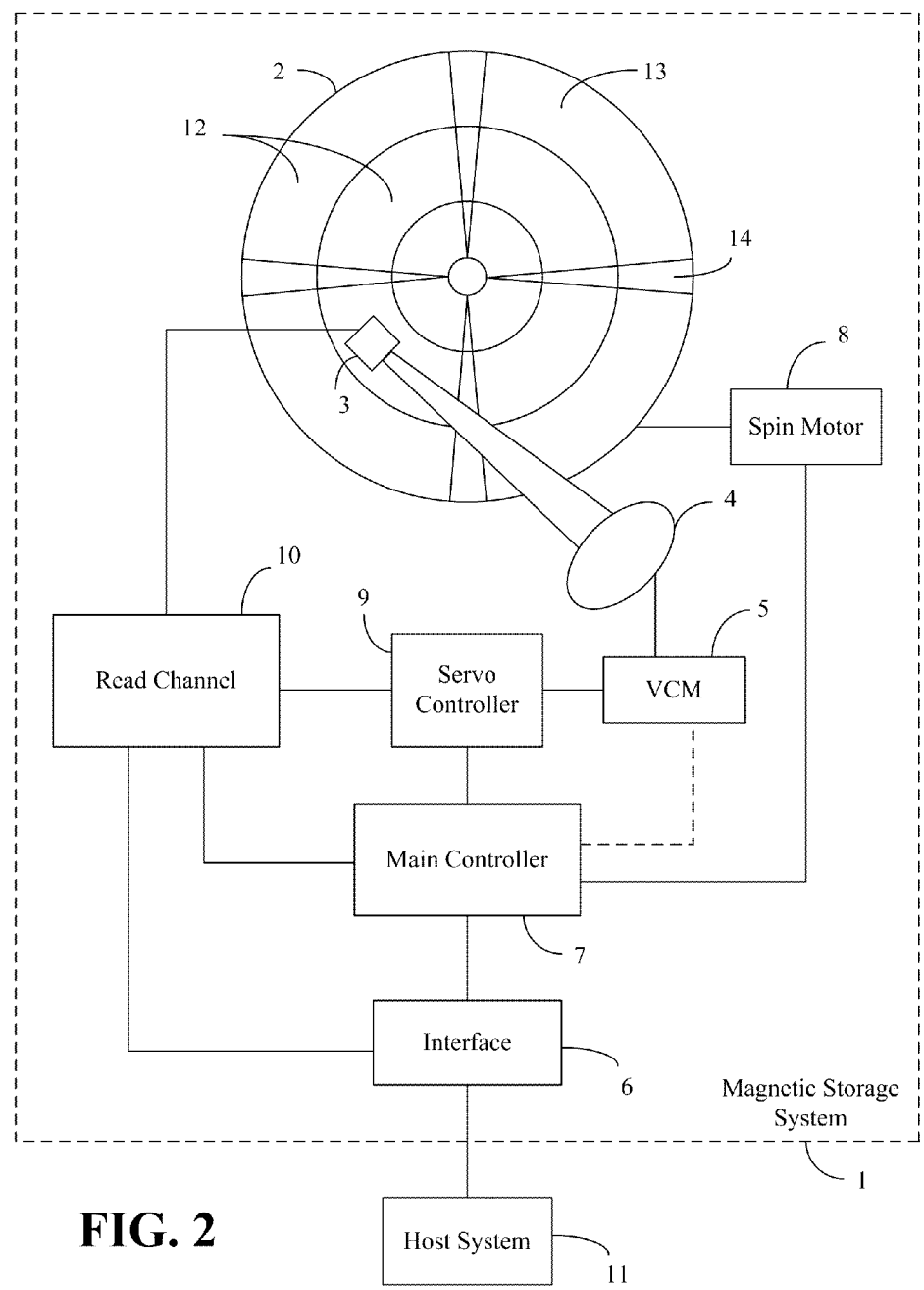
FIG. 2 illustrates a functional block diagram of a magnetic storage system of an embodiment of the present invention.

FIG. 2 illustrates a functional block diagram of a magnetic storage system 1 of an embodiment of the present invention. The magnetic storage system 1 comprises a disk 2, a transducer or head 3, an actuator 4, a voice coil motor (VCM) 5, an interface 6, a main controller 7, a spin motor 8, a servo controller 9, and a read channel 10. During operation, the disk 2 spins around a central axis, and the head 3 reads data from or writes data to a surface of the disk 2. The head 3 is supported on an arm of the actuator 4, and the VCM 5 rotates the actuator 4 about an axis in order to control a position of the head 3 over the disk 2.

The magnetic storage system 1 is not limited to having only a single disk 2, but may have a plurality of disks. Also, data may be written to both a top surface and a bottom surface of each disk, in which case a different head is required for each surface. The head 3 may have a single element for performing both reading and writing, or the head 3 may have separate elements for performing each of those operations, in which case the head 3 would comprise a read element and a write element. In addition, the head 3 may be connected to a secondary actuator located at an end of the arm of the actuator 4 for performing fine positioning of the head 3.

In the following discussion, the magnetic storage system 1 is described with reference to functional blocks and not discrete hardware elements. The functions may be implemented using one or more of hardware, software, and firmware. In addition, more than one function, or different parts of functions, may be combined in a given hardware, software, or firmware implementation.

When the magnetic storage system 1 is connected to a host system 11, the interface 6 communicates with the host system 11 to receive, for example, data and commands, and to send, for example, data and status identifiers. The interface 6 also communicates with the main controller 7 and the read channel 10 to send and receive, for example, data and commands. When the main controller 7 receives a command from the interface 6 for a read or a write operation, the main controller 7 provides a signal to the spin motor 8 to cause the disk 2 to spin.

As shown in FIG. 2, the disk 2 has a plurality of tracks 12 for storing data. Each of the tracks 12 has a plurality of data sectors 13 and a plurality of embedded servo sectors 14. During operation of the magnetic storage system 1, a data block may be written to a data sector of the plurality of data sectors 13. The plurality of embedded servo sectors 14 are written with servo patterns that are used for determining a position of the head 3 with respect to a track of the plurality of tracks 12.

When performing a read or a write operation, the main controller 7 sends a signal that contains information about a selected track to the servo controller 9. The servo controller 9 then provides a positioning signal to the VCM 5, and the VCM 5 rotates the actuator 4 according to the positioning signal in order to position the head 3 over the selected track. The head 3 reads data from embedded servo sectors of the selected track and provides the data read from the embedded servo sectors as servo information to the read channel 10, and the read channel 10 then provides the servo information to the servo controller 9. The servo controller 9 then sends a positioning signal to the VCM 5 to reposition the actuator 4 based on the servo information so that the head 3 is positioned toward a center of the selected track.

When the servo controller 9 determines that the head 3 is positioned over the selected track, the servo controller 9 sends a signal to the read channel 10 to allow for the start of a read or a write operation. It is also possible that the servo controller 9 sends the signal to the main controller 7 rather than to the read channel 10, in which case the main controller 7 would then send the signal to the read channel 10. The read channel 10 also receives a command from the main controller 7 that specifies the type of operation to be performed. In the case of a read operation, the read channel 10 causes the head 3 to read the data and then sends the data to either the interface 6 or the main controller 7. In the case of a write operation, the read channel 10 receives data from either the interface 6 or the main controller 7 and causes the head 3 to write the data.

Figure 3:
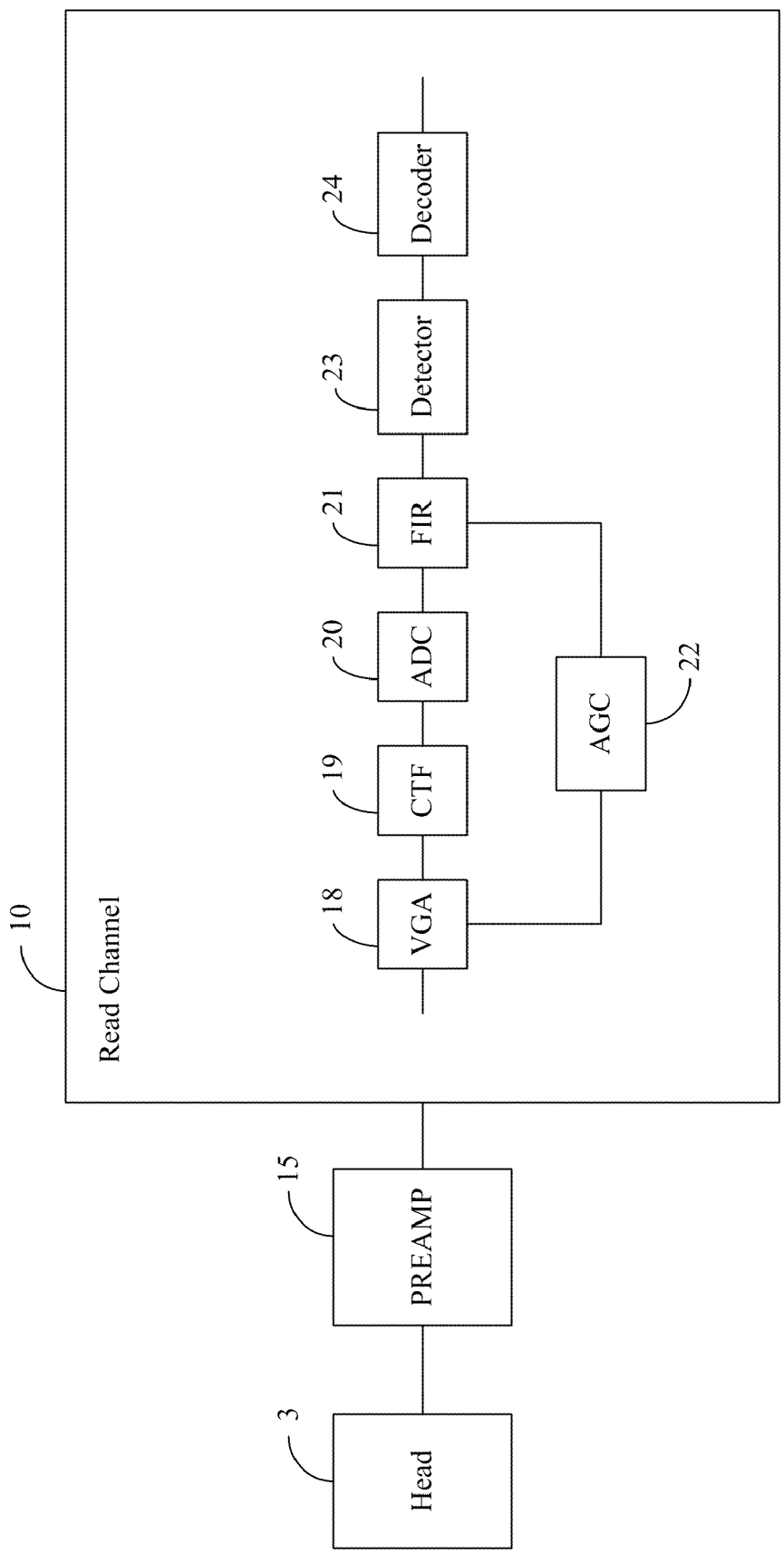
FIG. 3 illustrates a functional block diagram of a read channel in communication with a head by means of a pre-amplifier in accordance with an embodiment of the present invention.

FIG. 3 illustrates a functional block diagram of the read channel 10 in communication with the head 3 by means of a pre-amplifier (preamp) 15 in accordance with an embodiment of the present invention. The read channel 10 comprises a variable gain amplifier (VGA) 18, a continuous time filter (CTF) 19, an analog-to-digital converter (ADC) 20, a finite impulse response (FIR) filter 21, an automatic gain control (AGC) circuit 22, a detector 23, and a decoder 24.

When a read operation is performed, the head 3 senses magnetic flux transitions on a surface of the disk 2, and the head 3 provides an analog signal based on the magnetic flux transitions to the preamp 15. The preamp 15 amplifies the voltage of the analog signal provided by the head 3, and provides the resulting signal as an analog read signal to the read channel 10. In the read channel 10, the read signal is further amplified by the VGA 18 in accordance with a gain determined by the AGC circuit 22 as part of a gain control loop. The amplified read signal output from the VGA 18 is provided to the CTF 19. The CTF 19 provides coarse equalization and anti-aliasing of the amplified read signal.

The output of the CTF 19 is then input to the ADC 20, and the ADC 20 samples the input analog signal to provide digital samples. The digital samples are then input to the FIR filter 21, which further equalizes the input waveform to achieve a target response. The output of the FIR filter 21 is applied to a gain control loop comprising the AGC circuit 22. The AGC circuit 22 provides feedback to control a gain of the VGA 18 in order to provide a normalized gain for the read signal. The output of the AGC circuit 22 may also be stored in a register (not shown).

The output of the FIR filter 21 is also input to the detector 23. The detector 23 may be, for example, a Viterbi detector that is used to detect and correct errors in the digital samples. The output of the detector 23 is then applied to the decoder 24 where the digital samples are decoded, and digital data is output. Thus, the read channel 10 provides digital data based on an analog signal generated by the head 3 when the head 3 reads data from the disk 2. The various functions of the read channel 10 may be implemented by, for example, one or more of hardware, firmware, and software.

The main controller 7 is configured to perform operations related to disk error recovery. The main controller 7 may be implemented by one or more of hardware, firmware, and software. For example, the main controller 7 may comprise circuitry, such as an application specific integrated circuit (ASIC), a processor and a memory element, or the like.

Figure 4:
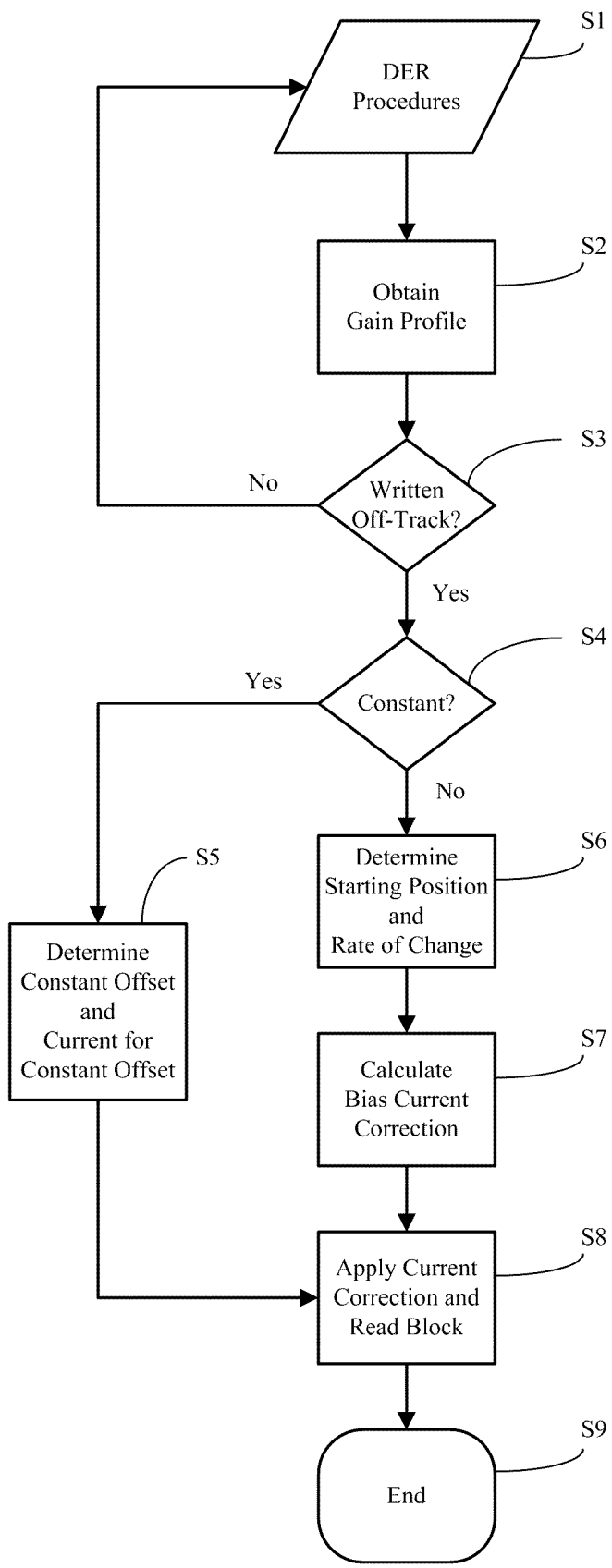
FIG. 4 is a flowchart illustrating an example process carried out by a magnetic storage system for inertial off-track recovery in accordance with an embodiment of the present invention.

FIG. 4 illustrates an example process carried out by the magnetic storage system 1 in accordance with an embodiment of the present invention. The process illustrated in FIG. 4 will hereinafter be referred to as Inertial Off-Track Recovery (IOR). The title, "Inertial Off-Track Recovery", reflects the idea that an object in motion tends to stay in motion, so a typical non-constant off-track write event is likely to be caused by a position of the head 3 changing in only one direction within a data sector, rather than the position of the head 3 alternating both up and down within the data sector. The process of FIG. 4 begins in S1 when the magnetic storage system 1 is performing a read operation and a read error is detected for a data block written in a data sector of a selected track.

In S1, the main controller 7 may perform zero, one, or more than one disk error recovery (DER) procedure. For example, the main controller 7 may be configured to store a list of thirty or more disk error recovery procedures and may initially perform a few of the procedures from the list. Such initial procedures may, for example, be targeted to recovering the data block based on the most common types of data read errors, or may be targeted to recovering the data block based on a detected operation of the magnetic storage system 1. An example of a disk error recovery procedure that may be performed initially in S1 is a reread, which would be an attempt to recover the data block by simply rereading the data block. If the disk error recovery procedures initially performed in S1 are not successful in recovering the data block, then the process continues to S2.

In S2, the main controller 7 obtains a gain profile. The main controller 7 is configured to cause the head 3 to read the data block of the selected track at each of a plurality of fixed offsets from a center of the selected track. The main controller 7 is further configured to sample a gain in the read channel 10 a plurality of times while the head 3 is reading the data block at each of the plurality of fixed offsets to obtain a plurality of gain samples for each of the plurality of fixed offsets. The plurality of gain samples for the plurality of fixed offsets are stored by the main controller 7 as a gain profile.

For example, the main controller 7 may be configured to cause the head 3 to read the data block at the offsets 0%, 5%, 10%, 15%, −5%, −10%, and −15% from the center of the selected track. Then, during each read, the main controller 7 may take multiple samples of a gain in the read channel 10. For instance, ten samples may be obtained during the read at 0% offset, ten samples during the read at 5% offset, an so on for each offset, in order to obtain a gain profile that is a cross-sector profile containing the gain samples for each fixed offset. Thus, the samples of the gain in the read channel 10 are obtained on a sub-block basis, because the gain is sampled a plurality of times during each read of the data block.

The gain in the read channel 10 that is sampled by the main controller 7 may be, for example, an amplifier gain of the VGA 18 that is determined by the AGC circuit 22, or may be a baseline gain of digital samples that are output by the ADC 20. The gain provided by the AGC circuit 22 is a feedback within the read channel 10, and the output of the AGC circuit 22 may be stored in a register. A value in the register may be updated while the head 3 reads data from the data block, and the value in the register may reflect an average gain applied to the data in the data sector by the VGA 18 up to the point where the read has progressed. Thus, the value in the register may specify how much gain needs to be applied by the VGA 18 to hold an amplitude of a read signal from the preamp 15 at a certain level.

The register may be sampled by the main controller 7 as the head 3 reads data from the data sector. The number of samples that may be obtained by the main controller 7 for each read is dependent on a transfer rate of a parallel interface (PIF) or a serial interface (SIF) of the read channel 10 that outputs values of the register to the main controller 7. A higher transfer rate of the PIF or SIF of the read channel 10 allows for more samples to be obtained during each read. A time between samples may be specified by a value T.

Any set of offsets may be employed to obtain the gain profile, but the offsets used to obtain the gain profile preferably include both positive and negative offsets so that an off-track deviation of the data block may be detected for any direction of the deviation. Any number of offsets may be employed, but using a small number of offsets, such as three, may allow for reducing a recovery time. Also, the number of samples obtained during each read may be one or more, but the main controller 7 preferably obtains five or more samples for each read of the data block in order to improve an accuracy of determinations made based on the gain profile.

The main controller 7 may be further configured to calculate an average of the gain samples and a standard deviation of the gain samples for each offset. The average of the gain samples for an offset may be calculated by, for example, summing the values of the gain samples for the offset and dividing by the total number of gain samples for the offset. The standard deviation of the gain samples for an offset may be calculated by, for example, any mathematical function for calculating the standard deviation of sample values. In addition, the main controller 7 may be configured to determine a specific offset from among the plurality of fixed offsets that has the lowest average gain. An example process for obtaining a gain profile, calculating average gains for each fixed offset of a plurality of fixed offsets, calculating standard deviations of gains samples for each fixed offset, and determining a lowest average gain among the plurality of fixed offsets is shown in greater detail in FIG. 5, which will be described later. Once the gain profile is obtained in S2, the process continues to S3.

In S3, the main controller 7 determines whether the data block was written off-track based on the obtained gain profile. The main controller 7 may be configured to determine whether the data block was written off-track by, for example, first determining whether the 0% fixed offset is the specific offset from among the plurality of fixed offsets that has the lowest average gain. If the 0% fixed offset does not have the lowest average gain, then the main controller 7 may determine that the data block was written off-track.

On the other hand, if the 0% offset does have the lowest average gain, then the main controller 7 may further determine whether the standard deviation for the gain samples at the 0% offset is within a first threshold value. The first threshold value may specify, for example, an upper limit value of a standard deviation of gain samples that would be expected if the data block was written on-track. If the 0% offset has the lowest average gain and the standard deviation of the gain samples at the 0% offset is within the first threshold value, then the main controller 7 may determine that the data block was not written off-track. However, if the standard deviation of the gain samples at the 0% offset is not within the first threshold value, then the main controller 7 may determine that the data block was written off-track. An example process for determining whether the data block has been written off-track is shown in greater detail in FIG. 6, which will be described later.

If the determination is made in S3 that the data block was not written off-track, then the process returns to S1. When the process returns to S1, the main controller 7 may continue to perform, for example, further disk error recovery procedures from the stored list of disk error recovery procedures. However, the main controller 7 does not need to perform any disk error recovery procedures that assume the data block was written off-track, such as head shifts, because the determination has already been made in S3 that the data block was not written off-track. Thus, the number of data recovery procedures that are performed may be reduced and, thus, a recovery time may be reduced. On the other hand, if the determination is made in S3 that the data block was written off-track, then the process continues to S4.

In S4, the main controller 7 determines whether an offset of the data block from the center of the selected track is constant based on the obtained gain profile. For example, the main controller 7 may be configured to determine whether the standard deviation of the gain samples at the specific offset that has the lowest average gain is within a second threshold value. The second threshold value may specify, for example, an upper limit value of a standard deviation of gain samples that would be expected if the data block was written off-track with a constant offset at the specific offset. The second threshold value may be the same as the first threshold value described above. If the standard deviation of the gain samples at the specific offset that has the lowest average gain is within the second threshold value, then the main controller 7 may determine that the data block was written with a constant offset. On the other hand, if the standard deviation of the gain samples at the specific offset that has the lowest average gain is not within the second threshold value, then the main controller 7 may determine that the data block was not written with a constant offset. An example process for determining whether the offset of the data block is constant is shown in greater detail in FIG. 7, which will be described later.

If the determination is made in S4 that the data block has a constant offset, then the process continues to S5 where an approximate constant offset is determined based on the gain profile. For example, the main controller 7 may be configured to determine that the constant offset of the data block is approximated by the specific offset from among the plurality of fixed offsets that has the lowest average gain. An example process for determining an approximate constant offset of the data block is shown in greater detail in FIG. 8, which will be described later.

The main controller 7 may be further configured to determine a current that is required to be applied to the VCM 5 to move the actuator 4 so that the head 3 is positioned at the determined approximate constant offset. A conversion value may be determined in advance that specifies how much current is needed to cause a movement of a predefined amount by the actuator 4, and the main controller 7 may be configured to store the conversion value. Then, the main controller 7 may use the conversion value to determine how much current needs to be applied to the actuator 4 to position the head 3 at the approximate constant offset.

Once the main controller 7 determines the bias current needed to cause the head 3 to read the data block at the approximate constant offset, the process continues to S8 where the bias current is applied and the data block is read. In various embodiments, the main controller 7 may be configured to apply the current directly to the VCM 5 to cause the VCM 5 to move the actuator 4. In various other embodiments, the main controller 7 may be configured to send a value of the required current to the servo controller 9, and then the servo controller 9 may apply the current to the VCM 5. Once the data block is read in S8, the process ends in S9.

On the other hand, if the determination is made in S4 that the data block does not have a constant offset, then the process continues to S6. In S6, the main controller 7 determines an approximate starting position and an approximate rate of change of an off-track deviation of the data block based on the gain profile. Thus, an approximate starting position and an approximate rate of change of the off-track deviation of the data block can be determined, so that the data block can be recovered even if the data block has been written off-track with a non-constant offset. The approximate starting position and the approximate rate of change are approximations of an actual starting position and an actual rate of change of the off-track deviation of the data block. The accuracy of the approximations is limited by the number of samples obtained for each fixed offset in the gain profile.

The approximate starting position of the off-track deviation of the data block represents a position in the data sector at which the data block begins to drift from the center of the selected track. The approximate starting position may be specified, for example, in terms of a sample number of a gain sample for an offset in the gain profile at which the data block begins to drift. By multiplying the sample number at which the data block begins to drift by the amount of time between samples, the main controller 7 may determine a time that it takes for the head 3 to read a portion of the data block from a beginning of the data sector to the position in the data sector at which the off-track deviation begins. The approximate rate of change of the off-track deviation of the data block represents a rate at which the data block drifts from the center of the selected track beginning at the approximate starting position.

The main controller 7 may be configured to determine an approximate starting position of the off-track deviation of the data block based on the obtained gain profile. For example, the main controller 7 may be configured to differentiate the gain profile for the specific offset that has the lowest average gain. The gain profile may be differentiated by, for example, calculating a difference between each pair of consecutive gain samples at the specific offset that has the lowest average gain.

The main controller 7 may be configured to compare the resulting values in the differentiated gain profile with a third threshold value, and to determine a first resulting value, in order, among the resulting values that exceeds the third threshold value. The third threshold value may specify, for example, a upper limit value of a difference between consecutive gain sample values that would be expected if the data block was written at a constant offset. Thus, when a difference between consecutive gain samples exceeds the third threshold value, it can be determined that the data block has started to drift off-track at the position where those gain samples were obtained.

In addition, the main controller 7 may be configured to determine the particular gain sample numbers of the gain samples that are associated with the first resulting value in the differentiated gain profile that exceeds the third threshold value. Then, the main controller 7 may determine the starting position of the off-track deviation of the data block to be, for example, specified by the larger gain sample number of the particular gain sample numbers associated with the first resulting value, and by the specific offset that has the lowest average gain. An example process for determining the approximate starting position of the off-track deviation of the data block is shown in greater detail in FIG. 9, which will be described later.

The main controller 7 may be configured to determine an approximate rate of change of the off-track deviation of the data block based on the gain profile. For example, the main controller 7 may calculate the approximate rate of change of the off-track deviation of the data block by performing a polynomial fit for gain samples of the specific offset that has the lowest average gain. The gain samples used for the polynomial fit may include, for example, the gain sample at the determined starting position of the off-track deviation and all gain samples at the specific offset that come after the gain sample of the starting position. A function for performing a polynomial fit is a regression analysis tool that generates coefficients for an nth order polynomial equation based on input sample points. The calculated polynomial fit may be of any order. For example, the polynomial fit may be a liner fit that determines a slope of a line that approximates the off-track deviation of the data block. An example process for determining the approximate rate of change of the off-track deviation of the data block is shown in greater detail in FIG. 10, which will be described later.

Once the approximate starting position and the approximate rate of change of the off-track deviation of the data block have been determined, the process continues to S7. In S7, the main controller 7 calculates a bias current correction for reading the data block based on the approximate starting position and the approximate rate of change of the off-track deviation of the data block. A conversion value, as described above, may be determined in advance that specifies how much current is needed to cause a movement of a predefined amount by the actuator 4, and the main controller 7 may be configured to store the conversion value.

Then, the main controller 7 may calculate a bias current based on the approximate starting position and the approximate rate of change of the off-track deviation of the data block using the conversion value. For example, the main controller 7 may be configured to calculate a bias current that will allow the actuator 4 to position the head 3 during reading so that the position of the head 3 mimics the approximate rate of change of the off-track deviation of the data block beginning at the approximate starting position. The approximate rate of change may be converted into a bias current by using the stored conversion value. After the bias current is calculated, the process continues to S8.

In S8, the main controller 7 causes the head 3 to read the data block by, for example, applying the bias current correction to the VCM 5 to position the actuator 4, so that the head 3 is positioned in accordance with the bias current. It is also possible that the main controller 7 causes the servo controller 9 to apply the bias current correction to the VCM 5 to position the actuator 4. When the offset of the data block has been determined to be constant, the bias current is applied to the actuator 4 before the head 3 begins reading the data block.

When the offset of the data block has been determined to be non-constant, the main controller 7 causes the bias current to be applied to the actuator 4 so that, for example, the head 3 begins reading the data block at the specific offset with the lowest average gain. Then, once the head 3 has reached the approximate starting position of the off-track deviation while reading the data block, the main controller 7 may change the bias current, so that the head 3 is positioned in accordance with the approximate rate of change of the off-track deviation of the data block. The main controller 7 may determine when the head 3 has reached the approximate starting position by, for example, determining an amount of time that has passed since the head 3 starting reading data of the data sector in which the data block is written, or the amount of time that has passed since the head 3 finished reading an embedded servo sector that was positioned before the data sector in which the data block is written. The main controller 7 may determine a time at which the approximate starting position is reached by the head 3 during a read operation by multiplying the sample number of the approximate starting position in the gain profile by the amount of time between samples.

Therefore, the main controller 7 can cause a controlled positioning of the head 3 while the head 3 is reading the data block from the data sector and, thus, even if the data block has been written off-track with a non-constant offset, the data of the data block can still be recovered. It is also possible for the main controller 7 to determine a direction in which to cause the head 3 to be positioned by determining from the gain profile which direction provided gain samples with lower values in the gain profile. Once the bias current correction has been applied, and the data block has been read, the process ends in S9.

In accordance with the process shown in FIG. 4, the main controller 7 of the magnetic storage system 1 can obtain a gain profile of gain samples, from the read channel 10, for each of a plurality of fixed offsets at which the head 3 is caused to read the data block. Thus, the process allows for sampling a gain in the read channel 10 on a sub-block basis. Also, the main controller 7 is configured to determine whether the data block was written off-track based on the gain profile. If it is determined that the data block was not written off-track, the main controller 7 does not need to perform disk error recovery procedures for recovering an off-track data block and, thus, recovery time can be reduced as compared with related art data recovery procedures.

In addition, if it is determined that the data block has been written off-track, then the main controller 7 can determine whether the offset of the data block is constant. If the offset is determined to be constant, the main controller 7 can determine a bias current for reading the data block at an approximate constant offset, and can read the data block. If the offset is determined to be non-constant, then the main controller 7 can determine an approximate starting position and an approximate rate of change of the off-track deviation of the data block based on the gain profile. Then, the main controller 7 can cause a controlled positioning of the head 3 while the head 3 is reading the data block in accordance with the approximate starting position and the approximate rate of change. As a result, the data block can be recovered even when the data block has been written off-track with a non-constant offset.

A less complex, but less accurate alternative for reading a data block that has been written off-track with a non-constant offset would be to configure the main controller 7 to store a list of most probable starting positions and most probable rates of change of off-track deviations of data blocks. Then, instead of determining an approximate starting position and an approximate rate of change of an off-track deviation of a data block, the main controller 7 could try to read a failing data block in accordance with the starting positions and the rates of change in the list. The main controller 7 could continue to cause the head 3 to read a data block in accordance with the starting positions and the rates of change in the list until either the data block is read successfully or the starting positions and rates of change in the list have been exhausted.

Figure 5:
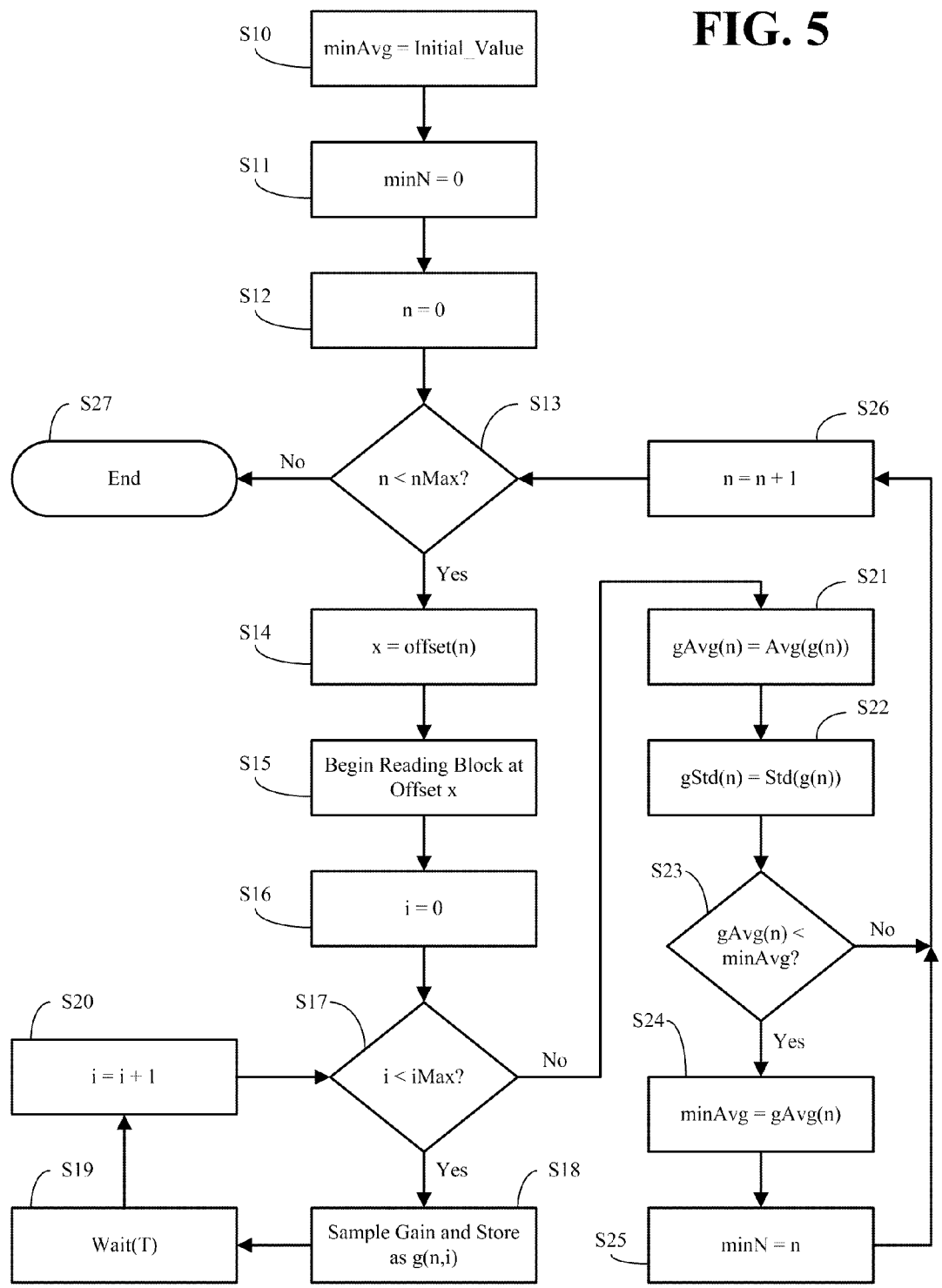
FIG. 5 is a flowchart illustrating an example process performed by a magnetic storage system to obtain a gain profile in accordance with an embodiment of the present invention.

FIG. 5 is a flowchart illustrating an example process performed by the magnetic storage system 1 to obtain a gain profile in accordance with an embodiment of the present invention. In S10, minAvg is set to an initial value, where minAvg is a variable that represents the lowest average gain value among all offsets for which gain samples have been obtained. Since no gain samples have yet been obtained, minAvg is set to the initial value that is selected to be, for example, greater than any expected average gain value, so that it will be replaced once an average gain is calculated for an offset. The process then continues to S11 in which minN is set to 0, where minN represents an index number specifying a fixed offset in an array of offsets that is associated with the lowest average gain that has been encountered so far in the processing. Since no gain sample have yet been obtained in S11, minN is initialized to 0, and the process continues to S12.

In S12, n is set to 0, where n represents a number of fixed offsets at which the main controller 7 has caused the head 3 to read a data block of a selected track during the process. The process then continues to S13, where the main controller 7 determines whether n is less than nMax, where nMax represents a total number of fixed offsets at which the head 3 is caused to read the data block in the process. If it is determined in S13 that n is less than nMax, then the process continues to S14.

In S14, the main controller 7 sets x to offset(n), where x is a variable specifying a fixed offset, and offset(n) is an nth offset in a list of offsets. For example, the offsets may be specified such that offset(0)=0%, offset(1)=6%, offset(2)=12%, offset(3)=−6%, and offset(4)=−12%. In practice, any values can be used for the offsets. In the process shown in FIG. 5, it is assumed that offset(0) is always the 0% offset. The process then continues to S15. In S15, the main controller 7 causes the head 3 to start reading the data block at the offset x from a center of the selected track, and the process continues to S16.

In S16, i is set to 0, where i represents a gain sample number at the offset x, and the process continues to S17. In S17, the main controller 7 determines whether i is less than iMax, where iMax is a number of gain samples that are to be obtained for each fixed offset. If it is determined in S17 that i is less than iMax, then the process continues to S18. In S18, the main controller 7 samples a gain in the read channel 10 and stores the gain in a gain profile g as g(n,i). The gain in the read channel 10 that is sampled by the main controller 7 may be, for example, an amplifier gain of the VGA 18 that is specified by the AGC circuit 22, a baseline gain of digital samples provided by the ADC 20, or the like. After the gain is sampled, the process continues to S19.

In S19, the main controller 7 waits for a time period T that is a time between taking gain samples in the read channel 10. The time period T is selected based on the number of samples desired for each offset and the total time needed to read the data block. If the main controller 7 can only sample a gain in the read channel 10 according to a transfer rate of a parallel interface (PIF) or a serial interface (SIF) of the read channel 10, then the time period T cannot be set below a value permitted by the transfer rate. Once the main controller 7 has waited the time period T, the process continues to S20 where i is incremented by one, and then the process returns to S17.

If it is determined in S17 that i is not less than iMax, then the process continues to S21. In S21, the main controller 7 calculates Avg(g(n)), which is the average of the gain samples obtained for the offset specified by offset(n), and the main controller 7 stores the value as gAvg(n), where gAvg is an array that stores the average gains for each offset. The process then continues to S22 in which the main controller 7 calculates Std(g(n)), which is the standard deviation of the gain samples obtained for the offset specified by offset(n), and the main controller stores the value of the standard deviation as gStd(n), where gStd is an array that stores the standard deviations for each offset. The process then continues to S23.

In S23, the main controller 7 determines whether gAvg(n) is less than minAvg. If it is determined in S23 that gAvg(n) is less than minAvg, then the process continues to S24 where minAvg is set equal to gAvg(n), and then continues to S25 where minN is set equal to n, and then the process continues to S26. On the other hand, if it is determined in S23 that gAvg(n) is not less than minAvg, then the process continues to S26. In S26, n is incremented by one, and the process returns to S13. If it is determined in S13 that n is not less than nMax, then the process ends in S27.

By performing the process shown in FIG. 5, the magnetic storage system 1 can obtain a gain profile that contains a plurality of gain samples for each of a plurality of fixed offsets. In addition, by performing the process shown in FIG. 5, the magnetic storage system 1 can calculate an average gain for the gain samples of each offset, and can calculate a standard deviation of the gain samples of each offset. Moreover, by performing the process shown in FIG. 5, the magnetic storage system 1 can determine a specific offset among the plurality of fixed offsets that has a lowest average gain.

Figure 6:
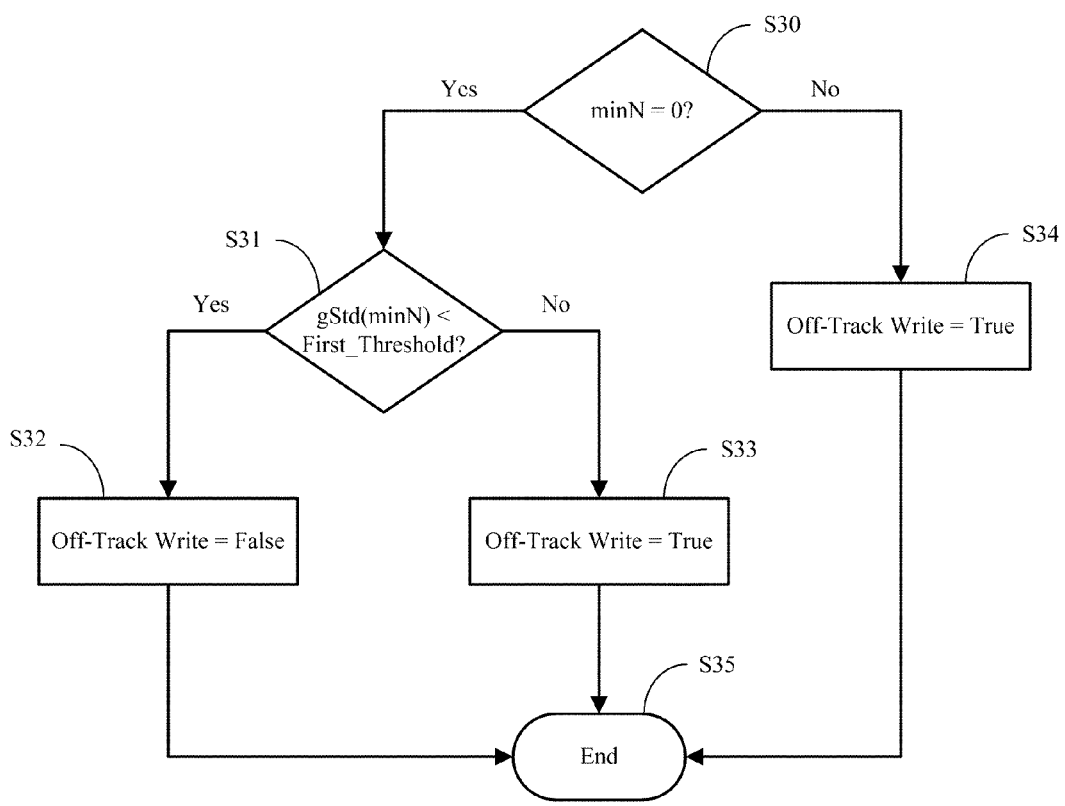
FIG. 6 is a flowchart illustrating an example process performed by a magnetic storage system to determine whether a data block of a selected track has been written off-track based on a gain profile in accordance with an embodiment of the present invention.

FIG. 6 is a flowchart illustrating an example process performed by the magnetic storage system 1 to determine whether a data block of a selected track has been written off-track based on a gain profile in accordance with an embodiment of the present invention. In S30, the main controller 7 determines whether minN is equal to 0, where minN has been determined in the process of FIG. 5 as being a number of a specific offset in a list of offsets that has the lowest average gain among all the offsets in the list. In the list of offsets specified in the process of FIG. 5, it was assumed that offset(0)=0%, so if minN is equal to 0, then the specific offset with the lowest average gain is the 0% offset. If it is determined in S30 that minN is not equal to 0, then in S34 the main controller 7 determines that the data block was written off-track, and the process ends in S35. The main controller 7 can determine that the data block was written off-track when minN is not equal to 0, because when minN is not equal to 0, there is an offset that has a lower average gain for gain samples than the 0% offset.

On the other hand, if it is determined in S30 than minN is equal to 0, then the process continues to S31. In S31, the main controller 7 determines whether gStd(minN) is less than a first threshold value, where gStd(minN) was determined in the process of FIG. 5. The first threshold value may specify, for example, an upper limit value of a standard deviation of gain samples that would be expected if the data block was written on-track. If it is determined in S31 that gStd(minN) is less than the first threshold value, then in S32 the main controller 7 determines that the data block was not written off-track, and the process ends in S35. On the other hand, if it is determined in S31 that gStd(minN) is not less than the first threshold value, then it is determined in S33 that the data block was written off-track, and the process ends in S35.

Thus, by performing the process shown in FIG. 6, the magnetic storage system 1 can determine whether the data block was written off-track based on the gain profile. In accordance with the process of FIG. 6, if the 0% offset does not have the lowest average gain among all offsets of the gain profile, then the main controller 7 can determine that the data block was written off-track. Also, even if the 0% offset has the lowest average gain, if the standard deviation of the gain samples at the 0% offset is not less than a first threshold value, then the main controller 7 can determine that the data block was written off-track. In the process of FIG. 6, the main controller 7 only determines that the data block was not written off-track if the 0% offset has the lowest average gain and the standard deviation of the gain samples at the 0% offset is less than the first threshold value.

Figure 7:
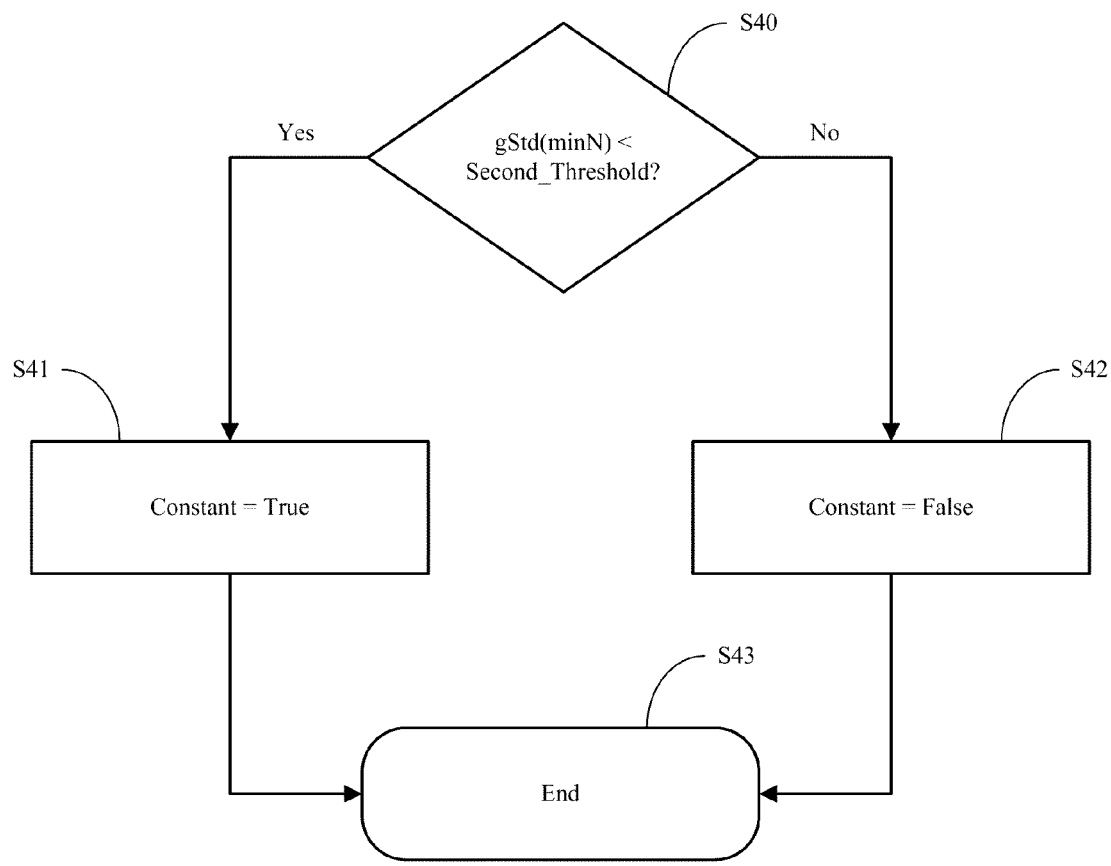
FIG. 7 is a flowchart illustrating an example process performed by a magnetic storage system to determine whether an offset of a data block from a center of a selected track is constant based on a gain profile in accordance with an embodiment of the present invention.

FIG. 7 is a flowchart illustrating an example process performed by the magnetic storage system 1 to determine whether an offset of a data block from a center of a selected track is constant based on a gain profile in accordance with an embodiment of the present invention. In S40, the main controller 7 determines whether gStd(minN) is less than a second threshold value, where minN and gStd(minN) have been determined in the process of FIG. 5. The second threshold value may specify, for example, an upper limit value of a standard deviation of gain samples that would be expected if the data block was written off-track with a constant offset at the offset specified by offset(minN). It is likely that the second threshold value will be the same as the first threshold value of the process of FIG. 6, and the threshold values can be set at predefined values.

If it is determined in S40 that gStd(minN) is less than the second threshold value, then in S41 the main controller 7 determines that the offset of the data block is constant, and the process ends in S43. On the other hand, if it is determined in S40 that gStd(minN) is not less than the second threshold value, then the main controller 7 determines in S42 that the offset of the data block is not constant, and the process ends in S43.

By performing the process shown in FIG. 7, the magnetic storage system 1 can determine whether a data block that was written off-track has a constant offset based on a gain profile. In accordance with the process of FIG. 7, the main controller 7 determines that the offset of the data block is constant if the standard deviation of the gain samples at the specific offset with the lowest average gain is within the second threshold value. Also, in accordance with the process of FIG. 7, the main controller 7 determines that the offset of the data block is not constant if the standard deviation of the gain samples at the specific offset with the lowest average gain is not within the second threshold value.

Figure 8:
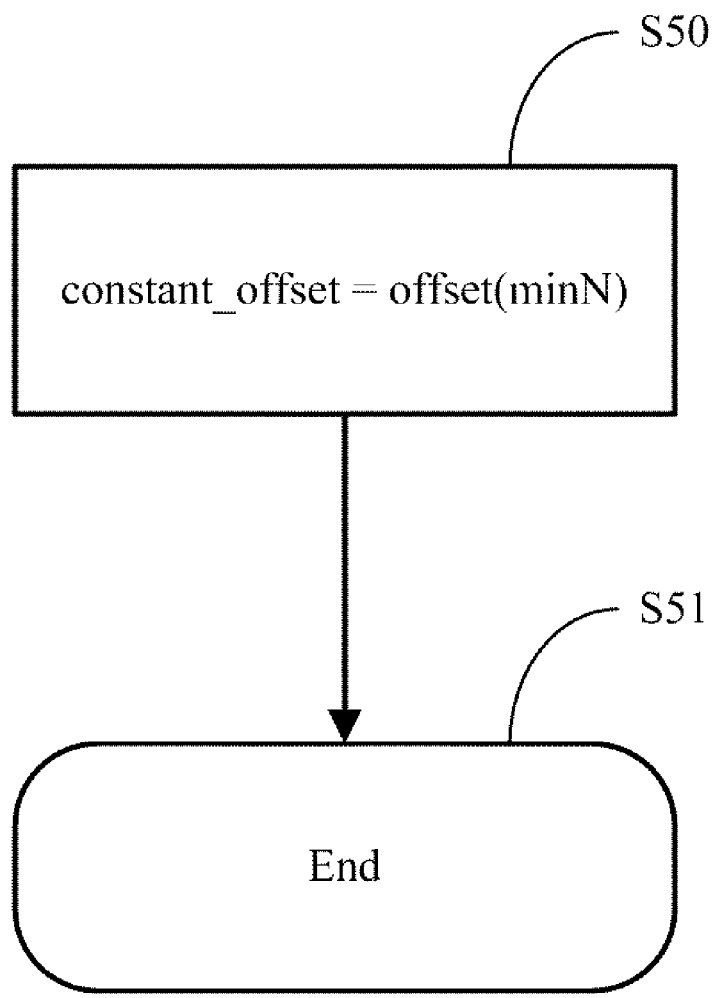
FIG. 8 is a flowchart illustrating an example process performed by a magnetic storage system to determine an approximate constant offset of a data block from a center of a selected track based on a gain profile in accordance with an embodiment of the present invention.

FIG. 8 is a flowchart illustrating an example process performed by the magnetic storage system 1 to determine an approximate constant offset of a data block from a center of a selected track based on a gain profile in accordance with an embodiment of the present invention. In S50, the main controller 7 sets the approximate constant offset equal to offset (minN), where minN was determined in the process of FIG. 5 such that offset(minN) has the lowest average gain among the plurality of fixed offsets used to obtain the gain profile in FIG. 5. The process then ends in S51. Therefore, in accordance with the process of FIG. 8, the main controller 7 determines the approximate constant offset of the data block to be the specific offset with the lowest average gain.

Figure 9:
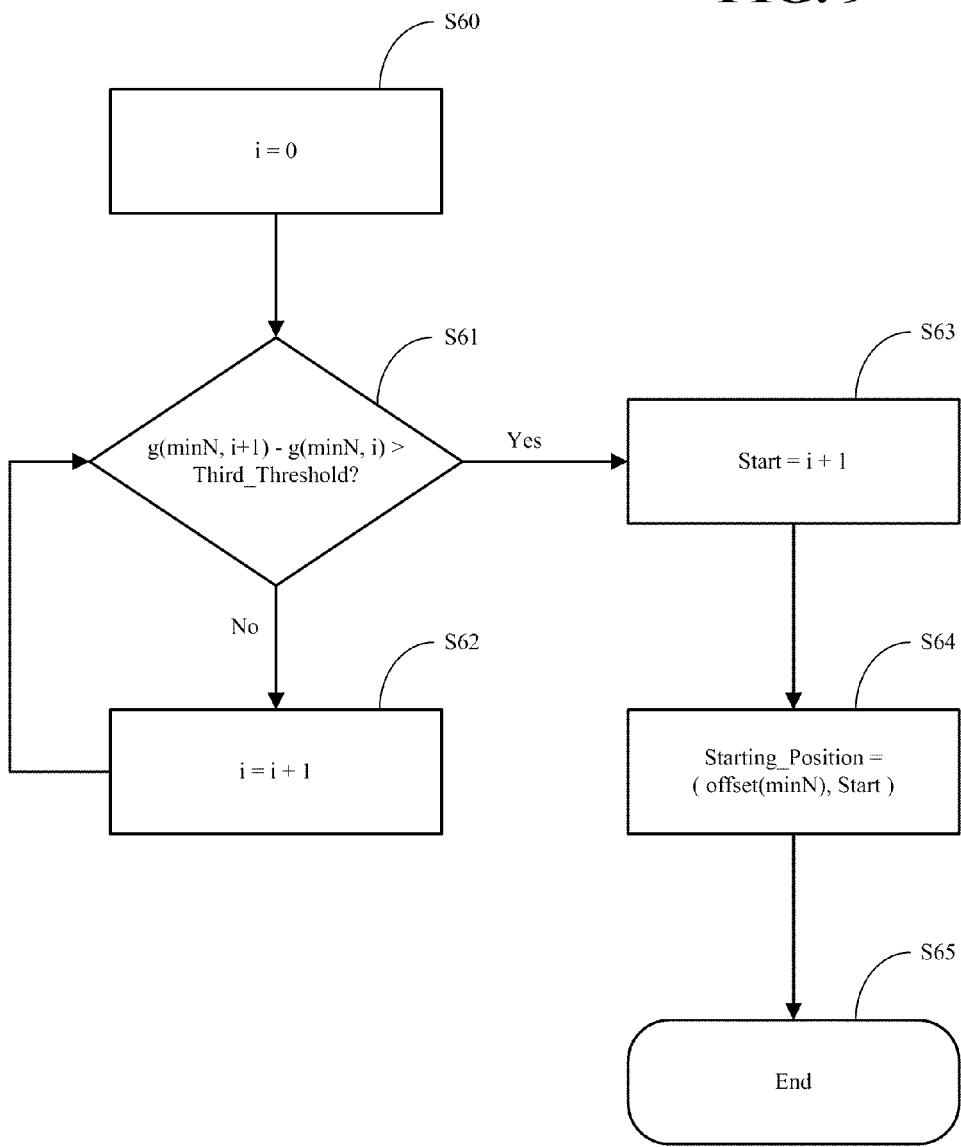
FIG. 9 is a flowchart illustrating an example process performed by a magnetic storage system to determine an approximate starting position of an off-track deviation of a data block from a center of a selected track based on a gain profile in accordance with an embodiment of the present invention.

FIG. 9 is a flowchart illustrating an example process performed by the magnetic storage system 1 to determine an approximate starting position of an off-track deviation of a data block from a center of a selected track based on a gain profile in accordance with an embodiment of the present invention. In S60, i is set to 0, and the process continues to S61. In S61, the main controller 7 determines whether g(minN, i+1)−g(minN, i) is greater than a third threshold value, where minN and g have been determined in the process of FIG. 5. The third threshold value may specify, for example, a upper limit value of a difference between consecutive gain sample values that would be expected if the data block was written with a constant offset.

If it is determined in S61 that g(minN, i+1)−g(minN, i) is not greater than the third threshold value, then the process continues to S62 in which i is incremented by one, and the process returns to S61. On the other hand, if it is determined in S61 that g(minN, i+1)−g(minN, i) is greater than the third threshold value, then the process continues to S63 where a start value is set to i+1, and the process continues to S64. In S64, the main controller 7 sets the approximate starting position of the off-track deviation of the data block to be a position specified by offset(minN) and the starting value. The process then ends in S65.

In accordance with the process of FIG. 9, the magnetic storage system 1 can determine when the data block first begins to drift from the center of the selected track by examining a difference between consecutive gain samples in the gain profile. In the process of FIG. 9, the main controller 7 determines when the difference between particular gain samples exceeds a third threshold value, and then sets the approximate starting position of the off-track deviation of the data block based on a sample number of one of those particular gain samples in the gain profile.

Figure 10:
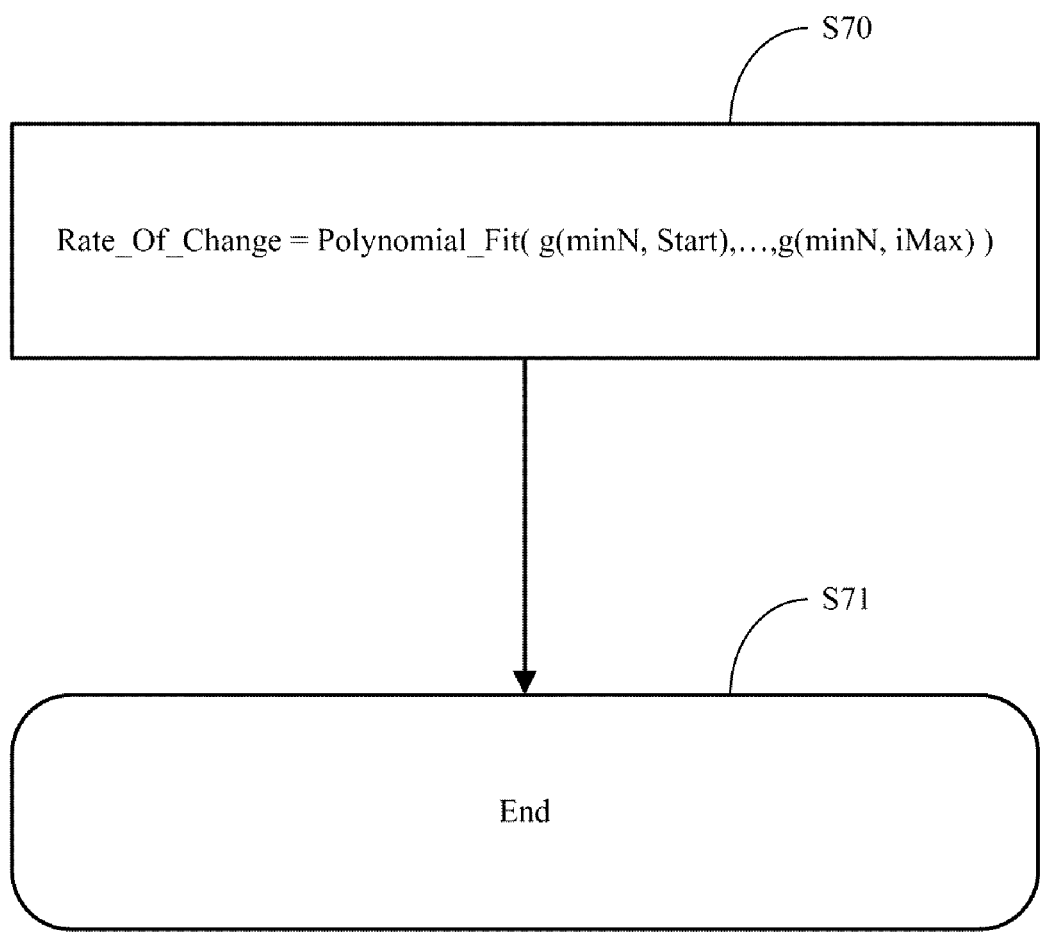
FIG. 10 is a flowchart illustrating an example process performed by a magnetic storage system to determine an approximate rate of change of an off-track deviation of a data block from a center of a selected track based on a gain profile in accordance with an embodiment of the present invention.

FIG. 10 is a flowchart illustrating an example process performed by the magnetic storage system 1 to determine an approximate rate of change of an off-track deviation of a data block from a center of a selected track based on a gain profile in accordance with an embodiment of the present invention. In S70, the main controller 7 sets the approximate rate of change of the off-track deviation of the data block to be equal to polynomial_fit(g(minN, start), . . . , g(minN, iMax)). The value for iMax is the same as for the process of FIG. 5. The values of minN and g are determined by the process of FIG. 5, and the start value is determined by the process of FIG. 9. The polynomial fit may be of any order, and may even be a liner fit that allows for a determination of a slope of the off-track deviation of the data block. The gain sample values that are used for the polynomial fit include the gain value at the starting position and those gain values in the gain profile g at the offset specified by offset(minN) that come after the gain value of the starting position. Thus, the gain samples of offset (minN) in the gain profile g before the gain sample of the starting position may be excluded from the polynomial fit when determining the approximate rate of change of the off-track deviation of the data block. Once the approximate rate of change of the off-track deviation of the data block is determined in S70, the process ends in S71.

After determining an approximate starting position and an approximate rate of change of the off-track deviation of the data block, the main controller 7 may calculate a bias current for reading the data block based on the approximate starting position and the approximate rate of change of the off-track deviation. For example, the main controller 7 may determine how much current is needed to be applied to the VCM 5 to cause the VCM 5 to move the actuator 4 while reading the data block so that a position of the head 3 is controlled according to the approximate starting position and the approximate rate of change of the off-track deviation.

Thus, the main controller 7 may cause the head 3 to start reading the data block at an offset specified by offset(minN) and, once the main controller 7 determines that the head 3 has read up to the starting point, the main controller 7 may cause the head 3 to be positioned away from the center of the selected track according to the determined approximate rate of change. Furthermore, the main controller 7 may determine which direction to position the head 3 away from the center of the selected track by determining from the gain profile which direction has produced lower gain samples in the gain profile.

Therefore, magnetic storage systems in accordance with various embodiments of the present invention can determine whether a data block has been written off-track, and can determine whether an offset of a data block from a track center is constant or non-constant. Also, magnetic storage systems in accordance with various embodiments of the present invention can determine an approximate starting position and an approximate rate of change of an off-track deviation of a data block, and can cause a controlled positioning of a head in accordance with the approximate starting position and the approximate rate of change while the head is reading the data block. Thus, magnetic storage systems in accordance with various embodiments of the present invention allow for the recovery of data blocks that have been written off-track with non-constant offsets.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. A storage system, comprising:
a controller configured to determine an approximate rate of change of an off-track deviation of a data block on a disk based on gain samples obtained by sampling a gain in a read channel and determine an approximate starting position of the off-track deviation of the data block based on particular gain samples.

2. The storage system of claim 1,
said controller configured to control a positioning of a head based on the approximate rate of change of the off-track deviation of the data block.

3. The storage system of claim 1,
said controller configured to cause a controlled positioning of a head, while the head is reading the data block, based on the approximate rate of change of the off-track deviation of the data block.

4. The storage system of claim 1,
said controller configured to calculate a bias current for positioning a head to read the data block based on the approximate rate of change of the off-track deviation of the data block.

5. The storage system of claim 4,
said controller configured to cause a controlled positioning of the head using the bias current.

6. The storage system of claim 1,
said controller configured to control a positioning of a head based on the approximated starting position and the approximate rate of change of the off-track deviation of the data block.

7. A storage system, comprising:
a head for generating an analog signal when reading from a disk;
a read channel for providing digital data based on the analog signal generated by the head; and
a controller configured to determine, based on gain samples obtained by sampling a gain in the read channel, an approximate starting position of an off-track deviation of a data block on the disk in a case where the off-track deviation starts after a beginning of the data block.

8. The storage system of claim 7,
said controller configured to control a positioning of the head based on the approximate starting position of the off-track deviation of the data block.

9. The storage system of claim 7,
said controller configured to determine an approximate rate of change of the off-track deviation of the data block based on particular gain samples.

10. The storage system of claim 9,
said controller configured to control a positioning of the head based on the approximate starting position and the approximate rate of change of the off-track deviation of the data block.

11. The storage system of claim 7, said read channel comprising:
a variable gain amplifier for providing an amplified analog signal by amplifying, according to an amplifier gain, the analog signal generated by the head;
an analog-to-digital converter for sampling the amplified analog signal to provide digital samples; and
an automatic gain control circuit for setting the amplifier gain of the variable gain amplifier based on at least one of the amplified analog signal or the digital samples;
wherein the gain in the read channel that is sampled is at least one of the amplifier gain or a baseline gain of the digital samples.

12. A method in a storage system, the method comprising:
determining an approximate rate of change of an off-track deviation of a data block on a disk based on gain samples obtained by sampling a gain in a read channel;
determining an approximate starting position of the off-track deviation of the data block based on particular gain samples; and
controlling a position of a head based on the approximate rate of change of the off-track deviation of the data block.

13. The method of claim 12, further comprising:
calculating a bias current for positioning the head to read the data block based on the approximate rate of change of the off-track deviation of the data block.

14. The method of claim 13, said controlling comprising:
controlling the position of the head using the bias current.

15. The method of claim 12, said determining comprising:
performing a polynomial fit using the gain samples.

16. A method in a storage system, the method comprising:
determining, based on gain samples obtained by sampling a gain in a read channel, an approximate starting position of an off-track deviation of a data block on a disk in a case where the off-track deviation starts after a beginning of the data block; and
controlling a position of a head based on the approximate starting position of the off-track deviation of the data block.

17. The method of claim 16, said determining comprising:
calculating a difference between at least two of the gain samples.

18. The method of claim 16, said controlling comprising:
moving the head away from a center of a track of the disk while the data block is being read.

* * * * *